June 19, 1962  C. T. WEYMANN  3,039,321
AUTOMATIC DRIVE
Filed Jan. 29, 1959   3 Sheets-Sheet 1
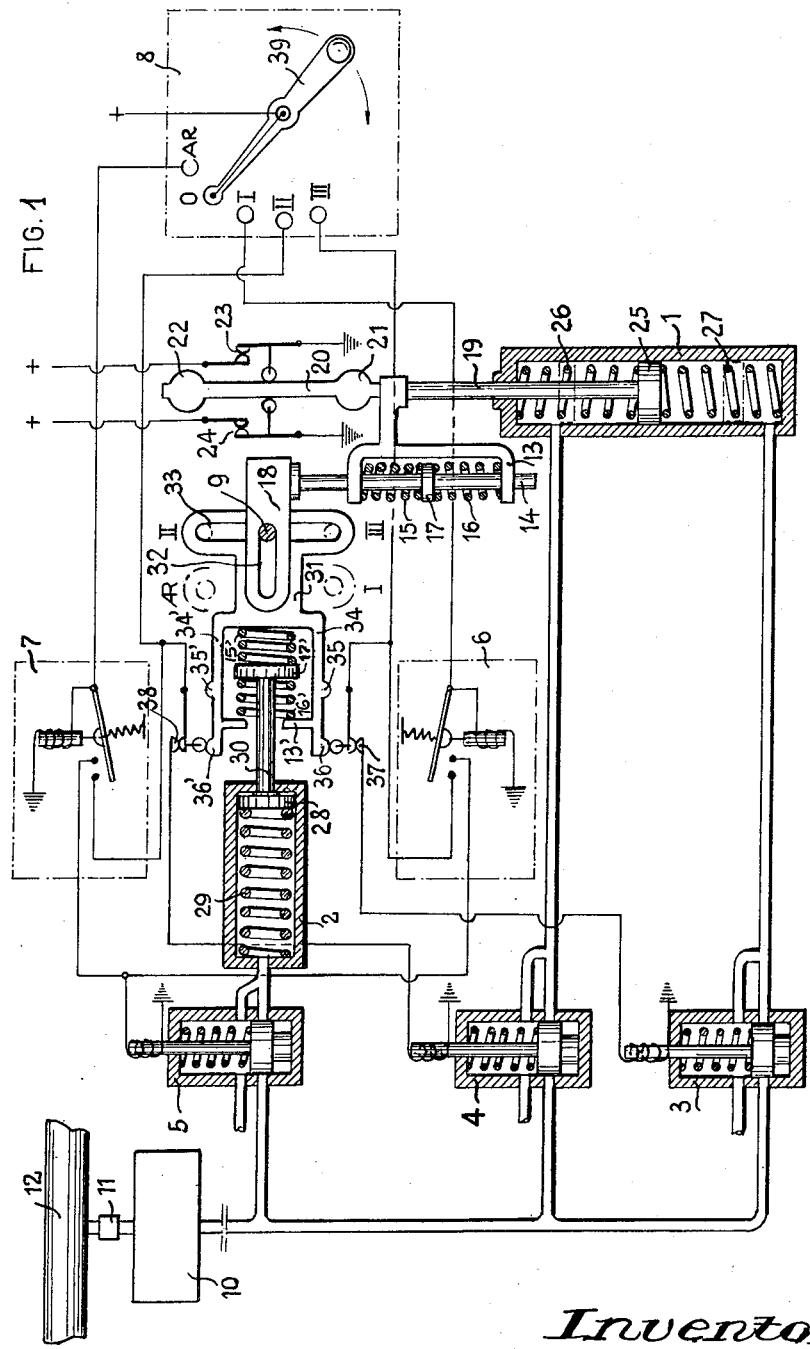
Inventor
C. T. Weymann

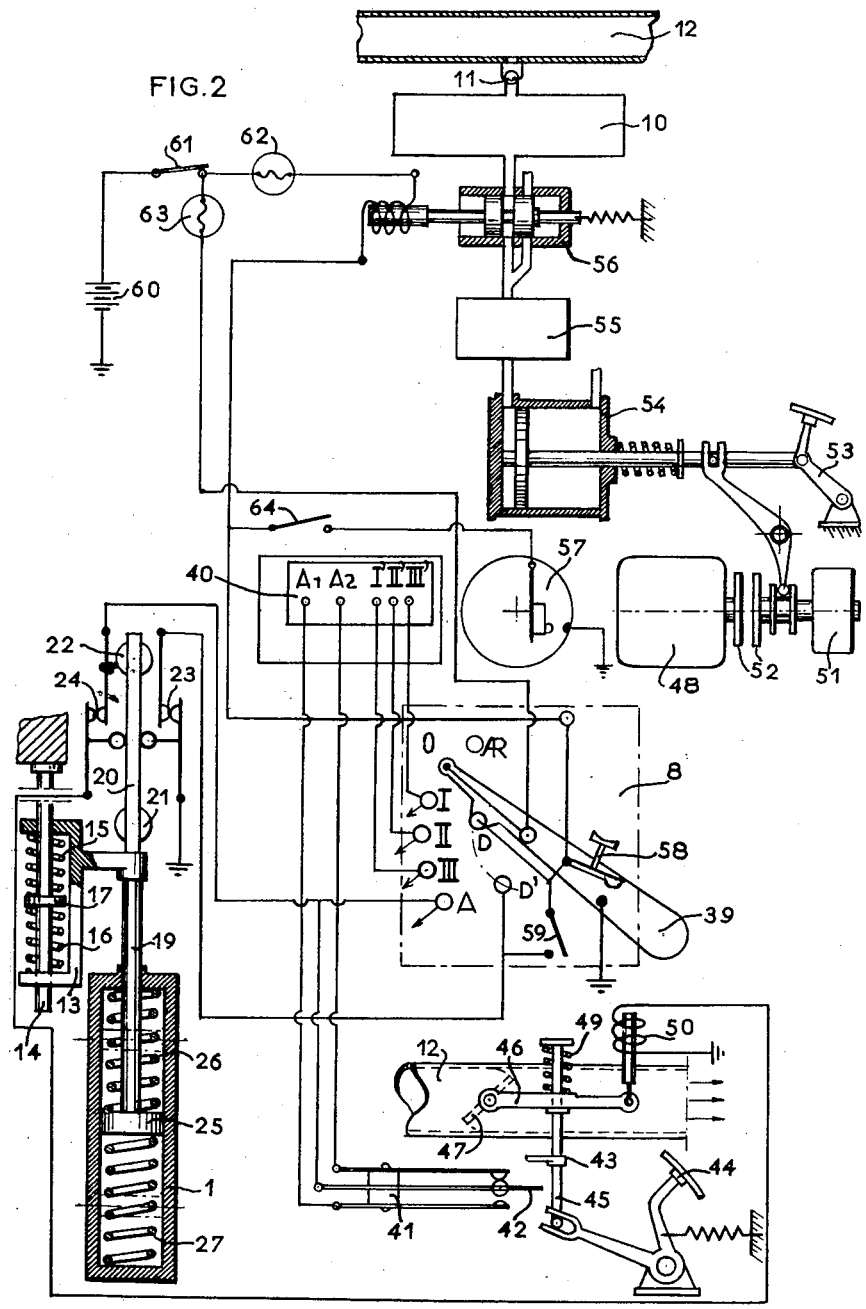

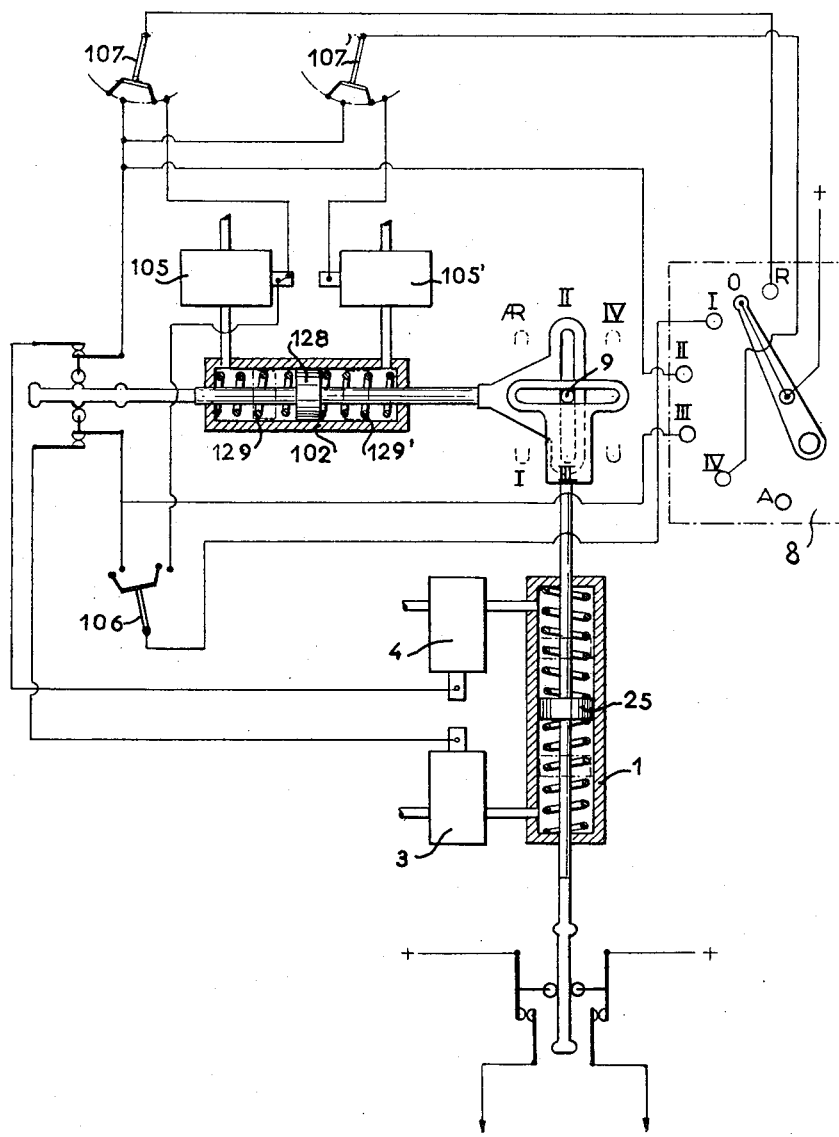

United States Patent Office 3,039,321
Patented June 19, 1962

1

3,039,321
AUTOMATIC DRIVE
Charles Terrès Weymann, 102 Ave. Victor Hugo,
Paris 16, France
Filed Jan. 29, 1959, Ser. No. 789,994
Claims priority, application France Jan. 31, 1958
3 Claims. (Cl. 74—336.5)

This invention relates to an automatic drive and especially to a device for automatically actuating a change-speed box of the type including at least two selecting gears usually called sliding gears, such as conventionally used on motor vehicles, as well as with certain stationary machine tools.

In such change-speed boxes, each selecting gear may selectively assume a neutral position in which it does not mesh with any other pinion of the box and a working position either single or selected among several ones (usually two), with each one of the working positions corresponding to a well-defined gear ratio or "speed."

The strokes of these selecting gears usually extend in substantially parallel directions (along which they are usually slidably mounted, which explains their conventional name of sliding gears). The gears are, as a rule, adapted to be selectively acted upon by means of one single common manually controlled change-speed lever, whose ends describe a H-shaped pattern as it is set to various positions corresponding to the different gear ratios to be provided by the change-speed box. The transverse arm of the H pattern corresponds to the so-called "out-of-gear" condition, in which all selecting gears are in neutral position, so that no drive is transmitted through the box.

An object of the invention is to provide an automatic drive including an automatic change-speed box actuating device capable of throwing out-of-gear a previously engaged selecting gear whatever it may be, so as to establish a neutral condition from any previously set speed of the box and then selecting one of the selecting gears and acting thereupon to bring the same from its neutral position to a working position (selected among its possible working positions if several) so as to set the box from neutral position to any desired "speed."

Another object of the invention is to provide an automatic drive of this type, wherein said actuating device is capable of directly acting upon the conventional change-speed lever, so that the said drive may be constructed as a self-contained unit adapted to be mounted on a vehicle without any modification of the same through extremely simple securing means.

A further object of the invention is to control the operation of the two actuators by means capable of co-ordinating their successive displacements as well as prohibiting any unwanted disturbance of their accurate sequence of work.

A more specific object of the invention is to use for this purpose pressure fluid cylinders driving cams which act on electric contacts controlling valve means interposed in the feeding duct system.

Another object of the invention is to make this necessary sequence of operations entirely automatic by associating the above-mentioned first actuator with means similar to those described above with reference to the coordination of the displacements of the two actuators, said means being capable of acting in the required fashion on known clutching and accelerating mechanisms and, in particular, on those which are existing on the equipped vehicle.

A device capable of automatically ensuring such a sequence of operations has been described in my co-pending application filed on October 23, 1958, under Ser. No. 769,120 for "Improvements in and Relating to an Automatic Clutch Engaging and Disengaging Device."

2

A further object of the invention is to provide an automatic drive of the type described, wherein the stroke of the actuators is longer than the maximum travel of the selecting gears, the additional stroke of the actuators being used for controlling the automatic clutch and acceleration control device and/or the means provided for co-ordinating the operation of the actuators.

Another object of the invention is to use as actuators, single acting or double-acting pressure fluid cylinders associated with elastic means continuously urging them towards their most frequently assumed position thereby obtaining a quicker operation as well as a considerable reduction of the power consumed for operating the actuators minimizing the wear of the mechanism.

Another object of the invention is to associate the automatic control box actuating device according to the invention with means responsive to the rotational speed of a part driven by the output shaft of the speed box or to the running speed of the equipped vehicle. For this purpose, it is preferred to use a device of the type described in my U.S. Patent No. 2,811,051 for "Automatic Change-Speed Device."

A specific object of the invention is to provide an automatic drive comprising, in combination, an automatic actuating device as described above, controlled by an automatic change-speed device according to U.S. Patent No. 2,811,051 and controlling in turn an automatic clutch engaging and disengaging device as described in my co-pending application Ser. No. 769,120, now Patent No. 2,983,346 issued May 9, 1961.

A more specific object of the invention is to complete an automatic drive of the type described in the last paragraph by a manual switching control by means of which the driver may set the whole drive at will either to "automatic," "semi-automatic" or "manual" conditions.

The invention thus finds a particularly interesting application in the driving of motor cars, in which the driver may eliminate, whenever he wishes, the various usual change-speed operations so that he may devote his full attention to observation of the road, control of the speed and drive proper.

A specific object of the invention is to use as actuators pneumatic cylinders or the like, adapted to be operated by the vacuum resulting from the suction action of the engine per se.

This arrangement is particularly advantageous in that it does not require any additional source of power on the vehicle and practically suppresses every problem of tightness and, hence, accurate machining.

It is clear that the automatic drive according to the invention may be used with a change speed box comprising any desired number of gears, each corresponding to a predetermined configuration of one or more change-speed levers.

Other objects and advantages of the invention will be apparent from the following detailed description, together with the accompanying drawings submitted for purpose of illustration only and not intended to limit the scope of the invention, reference being had for that purpose to the sub-joined claims.

In these drawings,

FIG. 1 is a diagrammatic view of an automatic drive according to the invention for a motor car equipped with a change-speed box providing three forward speeds and reverse drive.

FIG. 2 shows the combination of a device of the type of FIG. 1 with an automatic change-speed device and an automatic clutch engaging and disengaging device as previously referred to, and FIG. 3 shows an alternative construction of a device according to the invention, adapted to be used with a change-speed box providing four forward speeds and reverse drive.

In the drawings, the corresponding parts have been designated by the same references.

Referring first to FIG. 1, the automatic drive comprises a first double-acting pneumatic cylinder 1, a second single-acting pneumatic cylinder 2, respectively communicating, under the control of electro-valves 3, 4, 5, with a vacuum chamber 10 which is connected through a non-return valve 11 with suction duct 12 of the engine. The electro-valves 3, 4 and 5 are controlled by two electro-magnetic relays 6 and 7 actuated by a control switch 8. The cylinders 1 and 2 both act upon gear lever 9 of the change-speed box. The three forward speeds of the box respectively correspond to the positions of the lever 9 which are designated by I, II, III, while the reverse drive corresponds to that position of the said lever which is referred to as AR. Piston rod 19 of the cylinder 1 is rigid with a yoke or bracket means 13 in which a rod 14 is slidably mounted with its axis parallel to that of the cylinder 1. Two counter-acting springs 15 and 16 surround the rod 14 and are interposed between the inturned ends of the bracket 13 and a ring 17 integral with the rod 14. Thus, the rod 14 is continuously urged towards a mid rest or neutral position shown in FIGS. 1 and 2. The rod 14 terminates in a part 18, provided with an elongated slot 32, in which the lever 9 may freely move along in a direction perpendicular to the axis of the rod 14 and cylinder 1. The piston rod 19 of the cylinder 1 has an extension constituting a cam-carrying shaft 20 provided with two cams 21 and 22 alternatively acting upon two electric contacts 23 and 24 whenever piston 25 in the cylinder 1 reaches one end of its stroke. These contacts 23 and 24 may be used for actuating any desired signalling apparatus or automatic clutch control devices, as shown in FIG. 2. The piston 25 of the cylinder 1 is continuously urged by two counter-acting springs 26 and 27 towards a mid rest position shown in the figures. In the rest position, the part 18 urges the lever 9 towards a mid position corresponding to the transverse arm of the H pattern or out-of-gear condition, in which none of the selecting gears of the box is operative.

Piston 28 of the cylinder 2 is continuously urged towards a terminal rest position shown in FIG. 1 by a spring 29. Rod 30 of the piston 28 is connected with a part 31 provided with an elongated slot 33 extending perpendicularly to the slot 32 of the part 18 and in which the lever 9 can freely move in a direction perpendicular to the axis of the rod 30. The required interconnection between the rod 30 and the part 31 is ensured by a head 17' associated with two counter-acting springs 15' and 16' interposed between the head 17' and the arms of a bracket comprising the part 31 and an inturned flange 13' integral therewith. This construction, whose function is similar to that of the yoke or bracket structure 13 described with reference to cylinder 1, provides the piston 28 with an additional stroke beyond both positions of the lever 9, respectively corresponding to the ends of the transverse arm of the H pattern. Thus, in its rest position, the slot 33 tends to hold the lever 9 in registry with that vertical arm of the above-mentioned H pattern whose extremities respectively correspond to the second and third speeds of the box, which are the most frequently used for normal driving of a motor car. The part 31 is furthermore provided with two cam-carrying rods 34, 34' symmetrically arranged and each also carrying two symmetrically arranged cams 35, 35' and 36, 36' respectively, which alternately actuate two symmetrical electric contacts 37 and 38, as the piston of the cylinder 2 reaches each one of its ends of stroke. These contacts 37 and 38 are respectively incorporated in the energizing circuits of the electro-valves 3 and 4, respectively controlling the displacements in both directions of the double-acting cylinder 1. Under these conditions, the cylinder can be placed into communication with the vacuum chamber 10 to be actuated thereby only when the piston of the cylinder 2 is at one of its ends of stroke, which corresponds to the registry of the lever 9 either with that vertical arm of the H pattern which corresponds to the stroke of the first selecting gear associated with the first forward speed, and reverse drive when the cylinder 2 communicates with the vacuum chamber 10 or with the other vertical arm of the H pattern corresponding to the stroke of the second selecting gear associated with the second and third forward speeds when the cylinder 2 communicates with the atmosphere.

The lever switch 8 comprises a hand control 39 connected with one pole, e.g. the positive pole of an electric current source, such as, the accumulator battery of the vehicle.

Actuation of the hand lever permits activation of one of the contact studs AR, I, II or III, respectively corresponding to the reverse drive, first, second and third forward speeds of the change-speed box. Stud O is a neutral stud corresponding to "off" conditions of the whole device. The spacing between the studs is greater than the width of the active end of the hand lever 39, which overcomes any risk of short-circuiting between two consecuetive studs. The chamber 10 is continuously depressed from the intake 12 of the engine under the control of a non-return valve 11.

When the hand lever 39 is set on AR, the relay 7 is excited and causes energizing of both electro-valves 5 and 4. The electro-valve 5 places the cylinder 2 into communication with the chamber 10 and the lever 9 is brought into registry with that vertical arm of the H pattern which corresponds to the reverse drive selecting gear. The electro-valve 4, energized through the contact 38, also places upper portion of the cylinder 1 containing the spring 26 into communication with the chamber 10, which causes displacement of the piston 25 against the action of the spring 26. The rod 19 is pushed by the piston 25 and moves the lever 9 to the AR position, which places the above-mentioned selecting gear into reverse drive position. As the lever 9 reaches the AR position, it is stopped, while the piston 25 is further driven against the action of the spring 16. At the end of the overall stroke of the piston 25, the cam 21 opens the contacts 23 and 24.

However, the cylinder 1 may be operated only when the piston 28 of the cylinder 2 has reached its end of stroke, since as soon as the piston 28 of the cylinder 2 has left its rest position, the contact 38 is opened due to the displacement of the cam 36' with the rod 34' of the piston 28 and since said contact is only closed again by the cam 35' as the same reaches its position which corresponds to the end of that stroke of the piston 28 which takes place against the action of the spring 29.

Now, if the hand lever 39 is set on neutral position O, all circuits are cut off, and the electro-valves 3, 4 and 5 place the cylinders 1 and 2 into communication with the atmosphere. The piston 25 of the cylinder 1 resumes its rest position under the action of the springs 16 and 26, whereupon the spring 29 moves the piston 28 of the cylinder 2 also into its rest position shown in FIG. 1; thus, the change-speed lever 9 is returned into neutral position, in registry with the arms II, III of the H pattern. If the hand lever 39 is now set to position I, the relay 6 is excited thereby energizing the electro-valve 5 as previously described. The device operates in the same manner as that described with reference to the reverse drive, except that the opposite or lower portion of the cylinder 1, containing the spring 27, is placed into communication with the chamber 10, due to actuation of the electro-valve 3 through the contact 37 being closed by the cam 35. Thus, the piston 25 of the cylinder 1 is then displaced against the action of the spring 27 in a direction opposed to that described above for reverse drive, so as to bring the change-speed lever 9 to position I.

If the hand lever 39 is changed over from position I to position II, only the electro-valve 4 is energized. The piston 28 of the cylinder 2 resumes its rest position under the action of the spring 29, with the lever 9 in registry with the arms II, III of the H pattern and the piston 25 in cylinder 1 then pushes the lever 9 into position II.

Finally, if the hand lever 39 is changed over from II to III, the electro-valve 3 is energized and electro-valve 4 de-energized so that the piston of the cylinder 2 remains stationary, while piston 25 of the cylinder 1 moves the lever 9 from position II to position III.

There is no risk of unwanted operation, since the cylinder 1 may be actuated only if the cylinder 2 stands stationary at one of its ends of stroke.

In the automatic drive shown in FIG. 2, the switch 8 is provided with an additional stud A corresponding to an entirely automatic control of the change-speed box by means of a device responsive to the vehicle speed, of the type above referred to. This device is generally shown at 40. Its terminal $A_1$ corresponds to a range of critical change-over speeds correspondingly to the normal drive of the vehicle, while the terminal $A_2$ relates to another range corresponding to improved pick-up facilities. Change-over between these ranges is ensured by a switch 41 having a movable contact 42 actuated by a finger 43 integral with linkage means 45 which interconnects accelerator pedal 44 with gas valve means 47 in the suction duct 12. The valve means 47 may be closed, even when the pedal 44 is more or less depressed, against the action of a spring 49, by means of an electro-magnet 50 controlled by contact 24 actuated by the piston in cylinder 1. The studs I', II' and III' of the device 40 are respectively connected with the studs I, II and III of the switch 8 to which they transmit the change-speed orders if the hand lever 39 rests on the stud A.

Engine 48 may be coupled with the input shaft of change-speed box 51 by means of a disc clutch 52 controlled by a usual pedal 53. The pedal 53 may be actuated either conventionally by the driver or by a cylinder 54 controlled by an automatic clutch engaging and disengaging device of the type above referred to. The clutch automatic control comprises a rate adjusting unit generally shown at 55 for ensuring progressive starting followed by clutch engagement, which may be selected either progressively or suddenly. This automatic clutch device is controlled by an electro-valve 56 communicating with the vacuum chamber 10. The electro-valve 56 is controlled by a centrifugal force responsive mechanism 57, driven by the engine 48 as described in the above-mentioned co-pending application which permits automatic clutching only when the number of turns of the engine reaches a predetermined minimum, and which may be disconnected at will by opening a contact 64. The electro-valve 56 is further controlled by a manual contact 58 provided for the driver on the hand lever 39 of the component 8 as well as (provided that the hand control 39 is set in the stud A position in which a stud D also lies on a stud D' and/or that automatic clutch contact 59 be closed) via a contact 23 actuated by the piston of the cylinder 1. The studs O, I, II, III and AR of the switch 8 are connected as described with reference to FIG. 1 with the electro-valves 3, 4 and 5 controlling the cylinders 1 and 2. The electric equipment further comprises, as will be readily understood, a source of electric current such as accumulator battery 60, a general cut-off switch 61 as well as fuses 62 and 63 for respectively protecting the automatic clutch engaging and disengaging device and the automatic change-speed control means.

In this embodiment, when the piston 25 of the cylinder 1 is at one of its ends of stroke, the contacts 23 and 24 are kept open by one of the cams 21—22, the engine is clutched with the speed box and the accelerator pedal freely acts on the gas valve means 47. As the piston of the cylinder 1 begins to move in response to a change-speed order transmitted from the automatic device 40 with the hand control 39 in position A, the contacts 23 and 24 are closed at the very beginning of the additional stroke of the piston 25 before the latter has begun to shift the lever 9. The electro-magnet 50 lifts the lever 46 (as shown in FIG. 2) to throttle down the gas regardless of the position of the accelerator pedal. At the same time, the engine is declutched due to the energizing of the electro-valve 56. The gas is again put under the direct control of the accelerator pedal 44 and the engine is re-clutched only when the contacts 23 and 24 are opened again by one of the cams 21, 22 as the piston 25 reaches one of its ends of stroke.

If the driver wishes to select his speeds himself by means of the hand control 39, he may still keep the clutch engaging and disengaging controls automatic by closing the contact 59. He may cause also at any time automatic declutching by merely closing the contact 58.

Furthermore, if the driver wishes to reassume entirely manual control of his vehicle, he has only to open the overall cut-off switch 61 or to set the hand control 39 on position O, while keeping open the contacts 58 and 59. Finally, the driver still may control the change-speed lever 9 manually while keeping the clutching and declutching control automatic. For this purpose, he has only to set the hand control 39 in position O while closing the contact 59.

FIG. 3 shows an alternative embodiment of the automatic drive of FIGS. 1 and 2, wherein the speed box is adapted to provide four forward speeds and a reverse drive. Under these conditions, one of the speeds, the fourth as shown in FIG. 3, is necessarily located on a third vertical arm outside the H pattern. Thus, cylinder 102 has three positions, each corresponding to one of the three vertical arms and the speed box comprises three corresponding selecting gears. For this purpose, the cylinder 102 is of the so-called double-acting type. The cylinder is controlled by two electro-valves 105 and 105' and two counter-acting springs 129, 129' continuously urge its piston 128 towards a mid rest position in which the change-speed lever 9 registers with the mid vertical arm II, III of the speed pattern, which arm corresponds to the two speeds most frequently used for the motor vehicle drive.

The switch 8 is provided with an additional stud IV corresponding to the fourth speed and the cylinder 102 is rigid with a cam-carrying shaft provided with three cams respectively corresponding to the three positions of the piston 128 for which the change-speed lever 9 respectively stands on its three vertical strokes AR—I, II—III or IV. The electric equipment comprises three electro-magnetic relays 106, 107 and 107', selectively establishing the suitable connections for the various change-over operations, as broadly described with reference to FIG. 1. For the sake of clarity, the counter-acting spring bracket structure, provided to extend the stroke of the pistons 25 and 128 after the lever 9 has reached its ends of stroke so as to permit actuating the contacts associated with the various cams, has been omitted.

It has to be pointed out that the use of the depression due to the suction action of the engine for operating the actuators offers many advantages. As a matter of fact, this kind of energy may be consumed without practically weakening the engine power. This energy is usually wasted while the present invention permits its partial recovery and in particular during the deceleration periods. This may even improve the efficiency of the engine when the same is used for braking purposes. Moreover, the use of vacuum permits neglecting the leakages, which are so objectionable in the usual pneumatic or hydraulic cylinders. Nevertheless, it is obvious that any other suitable source of energy may be used for operating the actuators.

While the invention has been described with particular reference to preferred embodiments, it is not intended to limit the scope of the invention to the embodiments illustrated, nor otherwise than the terms of the subjoined claims.

What is claimed is:

1. In a motor vehicle having a change speed box including a gear changing member, a clutch, and electromagnetically controlled means for moving and maintaining said clutch in a disengaged position as long as the electromagnet remains energized, actuating means connectable to said gear changing member and movable in opposite directions for shifting said gear changing member between a normal neutral position and a speed engaging position, power means including a cylinder and piston means, bracket means connected to the piston rod of the piston means, means mounting the actuating means for sliding movement in the bracket means, a pair of counteracting springs operably connected to the actuating means and bracket means continuously urging the actuating means to an intermediate position, fluid means communicating with the cylinder above the piston for moving the piston and bracket means in one direction, and further fluid means communicating with the cylinder below the piston means for moving the piston means and bracket means in the opposite direction whereby said first-named fluid means displaces the piston means and bracket means in one direction so that the actuating means moves the gear changing member to the speed engaging position with one of said countersprings assuring smooth engagement while said further fluid means displaces said piston means and bracket means in the opposite direction with said one counterspring assuring smooth disengagement of the gear changing member for said speed changing position and the actuating means moving the gear changing member to said position with said other counterspring assuring smooth engagement.

2. In a motor vehicle as claimed in claim 1 further including a second actuating means movable in opposite directions for controlling the movement of the gear changing member perpendicular to the movement effected by the first-named actuating means and counteracting springs operably connected to said second actuating means assuring smooth engagement and disengagement of the gear changing member.

3. In a motor vehicle as claimed in claim 1, further including counteracting springs positioned on opposite sides of the piston normally urging the piston to an intermediate position.

References Cited in the file of this patent
UNITED STATES PATENTS

| | | |
|---|---|---|
| 1,911,599 | Bloxsom | May 30, 1933 |
| 2,017,776 | Thurber | Oct. 15, 1935 |
| 2,156,209 | Thurber | Apr. 25, 1939 |
| 2,169,216 | Bloxsom | Aug. 15, 1939 |
| 2,218,136 | Price | Oct. 15, 1940 |
| 2,252,009 | Kenny | Aug. 12, 1941 |
| 2,292,253 | Thurber | Aug. 4, 1942 |
| 2,397,883 | Peterson et al. | Apr. 2, 1946 |